United States Patent
Béraud (10) Patent No.: US 11,017,596 B2
(45) Date of Patent: *May 25, 2021

(54) METHODS, DEVICES, AND SYSTEMS FOR PART-TO-BUILD

(71) Applicant: D.P. TECHNOLOGY CORP., Camarillo, CA (US)

(72) Inventor: Nicolas Béraud, Saint Martin d'Hères (FR)

(73) Assignee: D.P. TECHNOLOGY CORP., Camarillo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/806,829

(22) Filed: Mar. 2, 2020

(65) Prior Publication Data
US 2020/0202621 A1 Jun. 25, 2020

Related U.S. Application Data

(63) Continuation of application No. 15/995,781, filed on Jun. 1, 2018, now Pat. No. 10,614,624.

(60) Provisional application No. 62/514,730, filed on Jun. 2, 2017.

(51) Int. Cl.
| | |
|---|---|
| G06T 17/20 | (2006.01) |
| G06T 19/20 | (2011.01) |
| G06T 7/70 | (2017.01) |
| G06T 17/05 | (2011.01) |
| B33Y 50/00 | (2015.01) |
| G06F 30/17 | (2020.01) |
| G06F 30/20 | (2020.01) |

(52) U.S. Cl.
CPC .............. *G06T 17/20* (2013.01); *B33Y 50/00* (2014.12); *G06F 30/17* (2020.01); *G06F 30/20* (2020.01); *G06T 7/70* (2017.01); *G06T 17/05* (2013.01); *G06T 19/20* (2013.01); *G06T 2210/32* (2013.01)

(58) Field of Classification Search
CPC ........... G06T 17/20; G06T 7/70; G06T 17/05; G06T 19/20; G06T 2210/32; B33Y 50/00; G06F 30/20; G06F 30/17
See application file for complete search history.

(56) References Cited

U.S. PATENT DOCUMENTS

| | | |
|---|---|---|
| 5,189,781 A | 3/1993 | Weiss et al. |
| 2016/0221262 A1 | 8/2016 | Das et al. |
| 2016/0274572 A1 | 9/2016 | Littrell et al. |
| 2019/0134914 A1 | 5/2019 | Gonzalez et al. |

*Primary Examiner* — Haixia Du
(74) *Attorney, Agent, or Firm* — Concept IP LLP; Pejman Yedidsion (57) ABSTRACT

Methods, devices, and systems for determining a job file for a three-dimensional printing machine based on part-to-build data. Embodiments include determining the part-to-build data based on: determining part data from a received computer-aided design (CAD) file, generating orientation data, generating support data, generating feature data, and generating slicing data. In some embodiments, determining the job file may be further based on generating nesting matrix associated with the part-to-build data.

16 Claims, 11 Drawing Sheets

METHODS, DEVICES, AND SYSTEMS FOR PART-TO-BUILD

CROSS-REFERENCE TO RELATED APPLICATIONS

This application is a continuation of U.S. Non-Provisional patent application Ser. No. 15/995,781 filed Jun. 1, 2018, which claims priority to and the benefit of U.S. Provisional Patent Application No. 62/514,730, filed Jun. 2, 2017, the contents of which are hereby incorporated by reference herein for all purposes.

TECHNICAL FIELD OF ENDEAVOR

The field of the invention relates to Additive Manufacturing and 3D printing, and systems thereof, and more particularly, to methods, devices, and systems for providing more efficient construction of a model for 3D printing while eliminating repeated input from the user and computation of data.

BACKGROUND

Additive Manufacturing (AM)—also known as 3D printing—refers to a variety of manufacturing processes where a part is built by adding material to a smaller base versus traditional subtractive manufacturing whereby material is removed, machined, from a larger stock. In powder bed additive manufacturing a heat source melts layer by layer the powder, in direct metal deposition the material is added, commonly as a solid or powder, to a melt pool created by a heat source. AM parts are first described as 3D CAD models to which the manufacturing instructions must be added and then all the data is converted into a job file which is used to drive the AM machine.

Building a part by AM processes may take anywhere from several hours to several days—depending on the AM method used and the size and complexity of the model. Accordingly, the processing time is still extremely long and laborious leaving room for much inefficiency.

SUMMARY

Additive manufacturing, also known as 3D printing, builds parts that are defined by 3D Computer-aided design (CAD) files. One or more 3D CAD file(s) may be combined, prepared for building with the manufacturing information needed to build them, and converted into a job file, which is used by the 3D printing machine to build the parts. The job file may comprise all the information needed to build the parts in a specific 3D printing machine.

In one embodiment, a system includes a part-to-build component, the part-to-build component includes a processor and an addressable memory, the processor configured to receive at least one computer-aided design (CAD) file, determine part data from the at least one CAD file based upon the received user input, generate orientation data associated with the determined part data via an orientation component, generate support data related to the determined part data via a support generation component, generate feature data related to the determined part data via a feature type component, generate slicing data related to the determined part data via a slicing component, and generate a part-to-build file the part-to-build file includes at least one CAD file, and at least one of part data, orientation data, support data, feature data, and slicing data, and a job generating component the job generating component includes a processor and an addressable memory, the processor configured to receive a generated part-to-build file, determine a nesting matrix related to the received part-to-build file via a nesting component, generate a job file the job file includes data for operating a three-dimensional printer, and output the job file to a three-dimensional printing machine.

In another embodiment, the part-to-build component processor is also configured to receive user input from a user interface.

In a still further embodiment, part data includes data relating to at least one part contained within a computer-aided design (CAD) file.

In still another embodiment, the generation of support data is also based on the generated orientation data.

In a yet further embodiment, the part-to-build component processor is also configured to receive surface recognition data related to the determined part data from an external surface recognition component.

In yet another embodiment the generation of feature data is based off of the received surface recognition data and defines characteristic features of the determined part data.

In a still yet further embodiment, the generation of slicing data is also related to orientation data, support data, and feature data.

In another embodiment, the part-to-build file includes at least one CAD file, part data, orientation data, support data, feature data, and slicing data.

In an additional embodiment, the job generating component processor is also configured to receive user input from a user interface.

In still yet another embodiment, the determination of a nesting matrix is also based upon the received user input.

In a still additional embodiment, the job file is capable of directing a three-dimensional printing machine to machine the data contained within the job file.

In yet further embodiments, a method includes transmitting a request to a three-dimensional (3D) printing machine for machine-specific data based on receiving job input data including data related to a desired build, receiving a part-to-build file the part-to-build file includes geometry data relating to at least one three-dimensional computer-aided design (CAD) file, and a set of manufacturing information data including at least one of part orientation data, support structure data, feature data, and slicing data, determining feature type data, generating exposure strategy data, determining nesting matrix data, and generating a machine job file based on the generated exposure strategy data and determined nesting matrix data.

In a yet additional embodiment, the manufacturing information data includes part orientation data, support structure data, feature data, and slicing data.

In a further embodiment again, the determination of feature type data is based on the feature data extracted from the received part-to-build file.

In an additional embodiment again, the generating of exposure strategy data is based on at least one of the determined feature type data and the machine-specific data.

In another further embodiment, the determining of nesting matrix data is based on the received job input data.

In another additional embodiment, the generation of a machine job file is also based on geometry data related to at least one three-dimensional CAD file of, slicing data, support structure data, feature data, and machine-specific data.

In still yet additional embodiments, a device for generating a job file includes a processor and addressable memory, the processor configured to receive at least one computer-aided design (CAD) file, determine part data from the at least one CAD file, generate orientation data related to the determined part data, generate support data related to the determined part data and, generate feature data related to the determined part data, generate slicing data related to the determined part data, and generate a part-to-build file the part-to-build file includes geometry data related to at least one CAD file and at least one of, part data, orientation data, support data, feature data, and slicing data, generate exposure strategy data based on the part-to-build file, determine nesting part data, and generate a job file.

In a yet additional embodiment, the generation of support data is based on the generated orientation data. In still yet another embodiment, the generation of slicing data is also related to orientation data, support data, and feature data.

In a yet further embodiment, the generation of a part-to-build file includes geometry data related to at least one CAD file, part data, orientation data, support data, feature data, and slicing data.

In a further embodiment again, the determination of nesting part data is related to the received part-to-build file. In an additional further embodiment, the generation of the job file is related to the received data in the part-to-build file, exposure strategy data, and nested part data.

BRIEF DESCRIPTION OF THE DRAWINGS

Embodiments are illustrated by way of example and not limitation in the figures of the accompanying drawing, and in which.

DETAILED DESCRIPTION

Figure 1A:
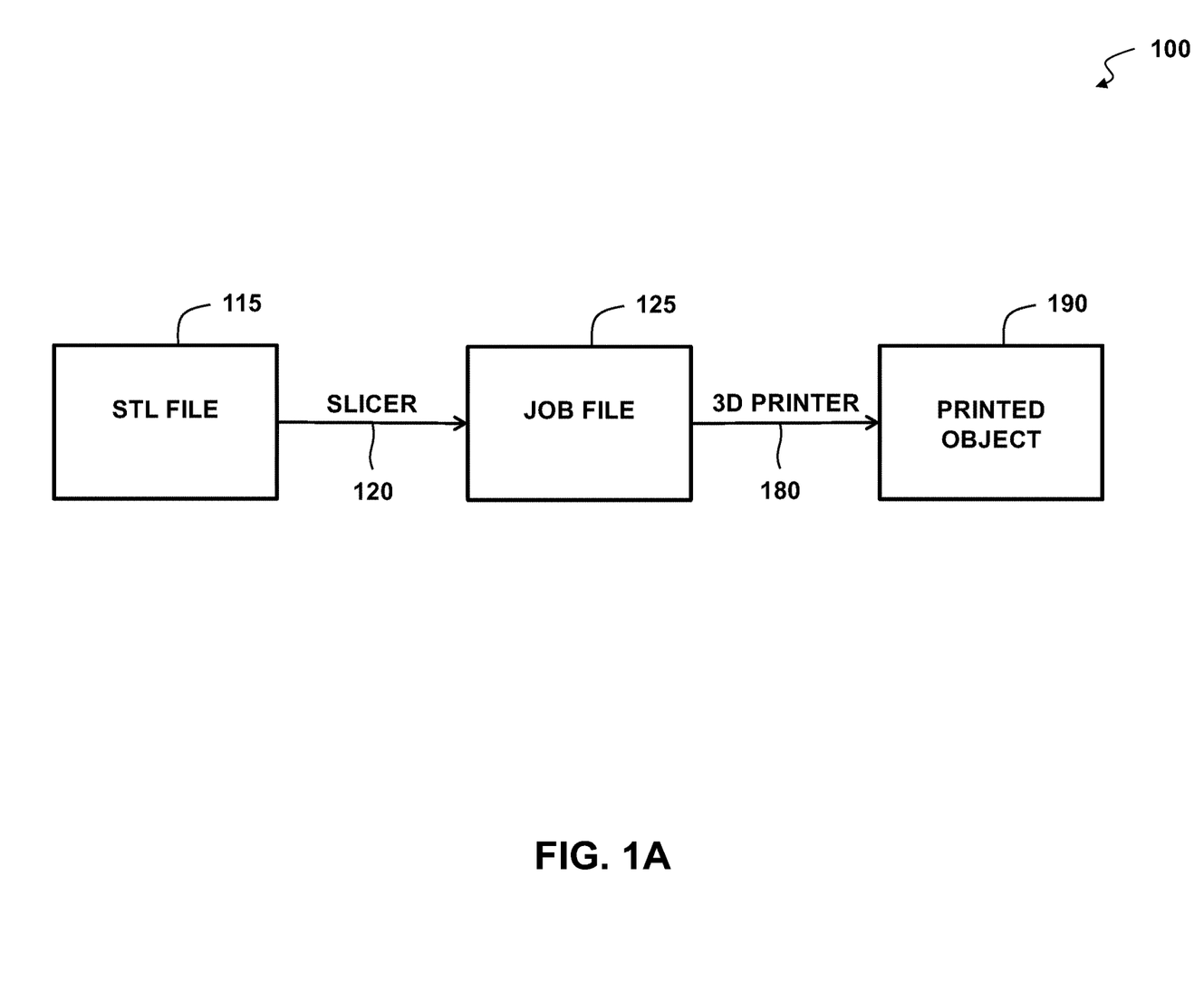
FIG. 1A depicts a current system of 3D printing.

FIG. 1A depicts an exemplary functional block diagram of a typical 3D printing process 100 where a 3D print design may be stored in a file format, for example, STereoLithography (STL) file 115. STL files 115 may describe surface geometry of a three-dimensional object in a raw, unstructured triangulated surface. Once the STL file 115 is created, the file may need to be processed by a slicer component 120. The slicer component 120 may convert the model stored in the physical file (STL file, 115) into a series of thin layers and produce a job file 125, i.e., printer instruction file, containing instructions tailored to a specific type of 3D printer. The job file 125 may then be printed with a 3D printing client component 180, which may itself load the job file 125, and use it to instruct the 3D printer during the 3D printing process. The 3D printing process may then create the printed object 190.

Figure 1B:
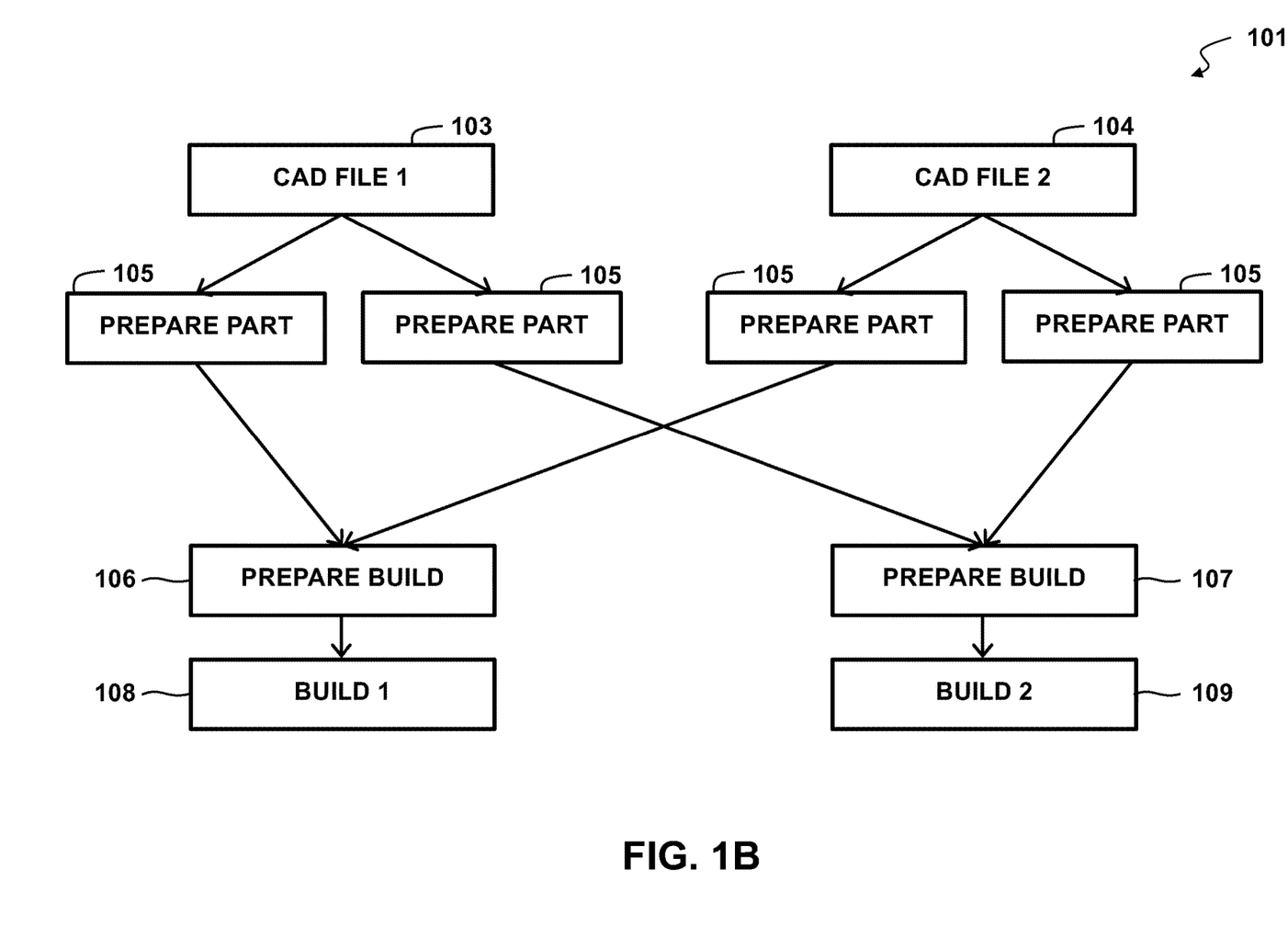
FIG. 1B depicts a functional block diagram of a current 3D printing process.

FIG. 1B, depicts an exemplary functional block diagram of a conventional 3D printing process 101 based on a received Computer-aided design (CAD) data file. CAD File 1 103 and CAD File 2 104 may go through the stages of first preparing the part 105, then preparing the build 106, 107, and outputting the converted build as Build 1 108 and Build 2 109. Generally, the process 101 starts with a CAD file 103, 104 and then each part is prepared 105 prior to building. Preparing a part 105 for a build may include determining which parts from each CAD file will be included in a particular build as a CAD file may include multiple parts, with only a subset of those parts being desired for printing by the user. Build preparation 106, 107 may, for example, include conversion of a CAD file 103, 104 into an STL file, sending the STL file to a slicer component, and translating the data to a native printer job file, where the job file may then be sent to the 3D printer for printing. In this method, all the parts are prepared and formatted for printing during the build preparation 106, 107. For example, given a part 1 and part 2 selected from a CAD file 103, 104, both are sliced and formatted for printing during the build preparation 106, 107. In this example, if there is a need to 3D print ten (10) units of part 1 and twenty (20) units of part 2, they would be sliced at the end of the build preparation 106. That is, the part 1 portion would need to be sliced 10 times and the part 2 portion would need to be sliced 20 times. As is evident in this method, multiple parts are typically needed for each CAD file and build. As depicted, multiple part preparations, slicing calculations, and data format processes may be necessary to achieve the desired build.

In aspects of the present embodiments, an embodiment of the Part-to-Build system may divide the process of preparing the job file into two steps and create a re-usable intermediary file: a Part-to-Build data file. Any given Part-to-Build file may be used in the generation of one or more job files without redefining or recalculating the manufacturing information necessary for a 3D print build. By way of an example and not limitation, some of the advantages of the Part-to-Build system may be: saving processing time by eliminating the need to repeatedly define the manufacturing information; improving part build consistency each time a part is built regardless of the job file; and maintaining traceability, since each build may be traced back to the original 3D CAD file and associated manufacturing information. In one example, the ability to trace the build for each produced part may allow identification of the corresponding job, and the corresponding Part-to-Build. That is, parts build from a given Part-to-Build data file may be identified making it possible to trace any differences between produced parts from the same Part-to-Build data.

In one embodiment, the Part-to-Build file may include the original 3D CAD file along with the manufacturing information needed to build it. That is, manufacturing information such as the following may be included:

Part orientation data in 3D space for the build;

Support structure data added to the oriented part;

Feature data defining characteristic features of the original parts for printing; and Slicing performed to save time generating subsequent job files.

Figure 2:
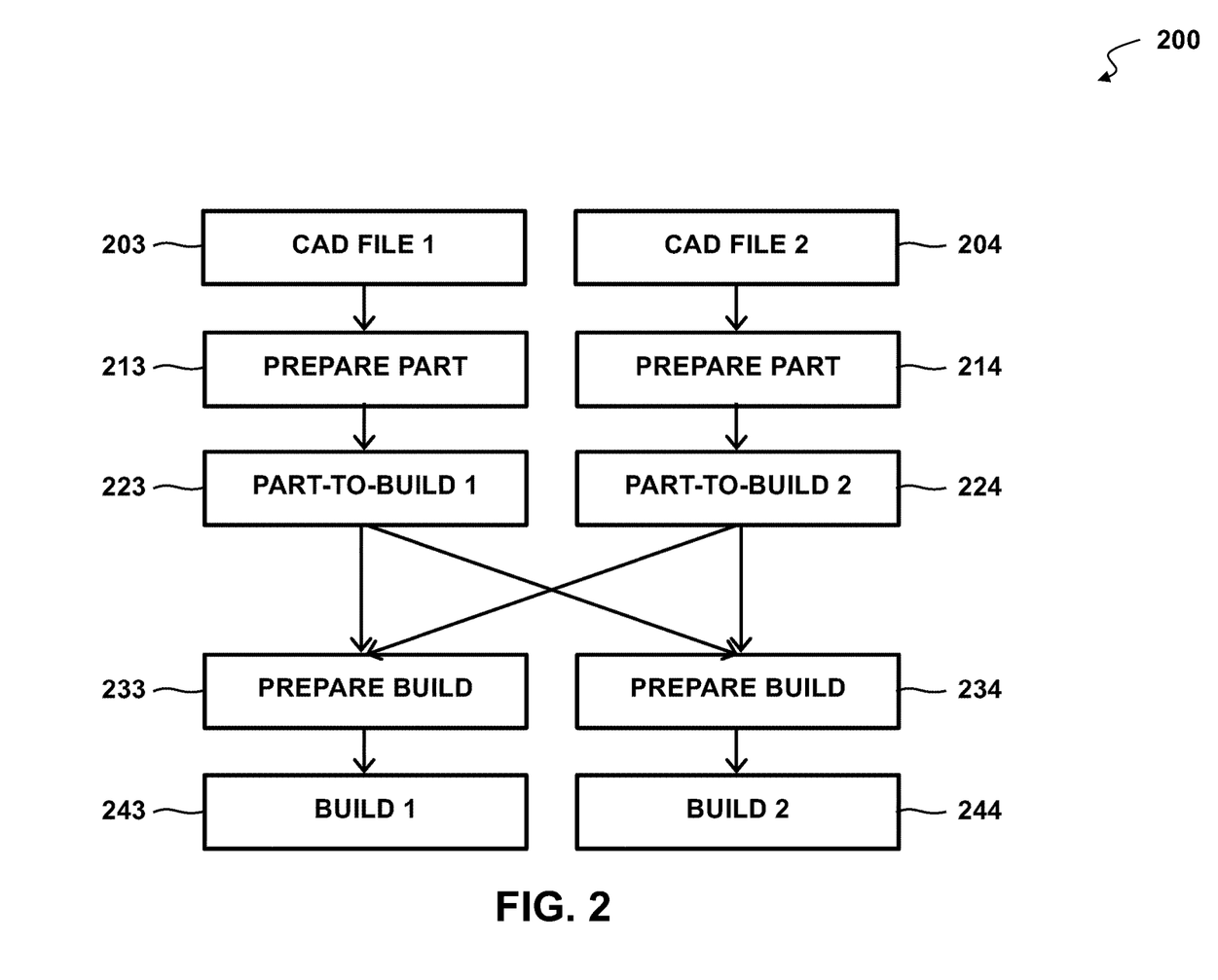
FIG. 2 depicts a functional block diagram of a Part-to-Build 3D printing process according to various aspects of the present embodiments.

As depicted in FIG. 2, 3D printing—or additive manufacturing—builds parts that are defined by CAD files 203, 204 where the CAD files 203, 204 may be 3D CAD files according to various aspects of the present embodiments. For example, the system 200 may receive the same CAD files, CAD file 1 203 and CAD file 2 204, as in FIG. 1B. In the Part-to-Build system 200, the one or more 3D CAD file(s) 203, 204 may be selected, combined, prepared 213, 214 for building with the addition of manufacturing information needed to build them, and converted into a Part-to-Build file 223, 224. In many embodiments, the Part-to-Build file 223, 224 may be an XML-style form file. In a number of embodiments, the Part-to-Build file 223, 224 comprises at least one 3D CAD file and associated manufacturing information related to 3D printing of the 3D CAD file(s). In various embodiments, Part-to-Build files may be utilized in build preparations 233, 234. In certain embodiments, 3D printing builds 243, 244 may be prepared 233, 234 with multiple Part-to-Build files 223, 224. In more embodiments, the build preparation 233, 234 generates a job file which is used by the machine to build 243, 244 the parts. The job file may comprise all the information necessary to build the parts in a specific machine. A job file in the Part-to-Build system 200 may include:

Manufacturing information data obtained from the one or more Part-to-Build files;

Nested and repeated matrix data as needed for the build;

Exposure strategy corresponding to each feature; and

Formatted machining data in the machine-specific input format.

In this embodiment, the slicing may be performed on the original CAD files 203, 204, that is, the part slicer may calculate the build layers (i.e., slices) directly from the original 3D CAD model for the highest level of performance and accuracy. The Part-to-Build system 200 may then perform the part preparation 213, 214, and introduce an intermediary step of a Part-to-Build file 223, 224 generation. The Part-to-Build data generation process may determine slices that can be stored with the Part-to-Build file 223, 224 along with feature information and support structure generation that may then be reused in multiple jobs, thereby saving time and providing consistency from build to build.

By way of example and not limitation, when a Part-to-Build system 200 is utilized, in comparison to the previous method of use depicted in FIG. 1B without the intermediate Part-to-Build files 223, 224, computational efficiencies can be realized. Similar to the process outlined in the discussion of FIG. 1B, a part 1 can be prepared one (1) time and only requires to be sliced one (1) time at the end of the preparation step 213, 214; subsequently, a part 2 can be prepared one (1) time and is only required to be sliced one (1) time at the end of the preparation step 213, 214. That is, ten (10) units of part 1 and twenty (20) units of part 2 are placed in the build chamber during the build preparation 223, 224 with only two slice calculations being performed, compared to the total of thirty (30) slices as per the example of FIG. 1B. Accordingly, to generate and export the build file, the slicing data is repeated (and transformed corresponding to the place and orientation of the part in the chamber), thereby requiring slicing calculations to be generated only two (2) times to produce 30 parts (versus slicing 30 times to produce 30 parts). In a subsequent job for making a part, the previously prepared Part-to-Build files 223, 224 and/or job files may be used for the 3D printing of part 1 and part 2. So, if the subsequent job requires a different number of parts, for example, 10 units of part 1 and 10 units of part 2, then by nesting, the subsequent job file may be based on the previously prepared parts in the Part-to-Build files 223, 224 (having the 3D CAD model and manufacturing information including slicing data). In one embodiment, the slicing may be done differently for a subsequent job based on the slicing method, and similarly, the manufacturing information may be updated or modified in subsequent jobs, however, data related to each part previously prepared can be utilized in the build preparation process, thereby potentially reducing the processing time.

Figure 3:
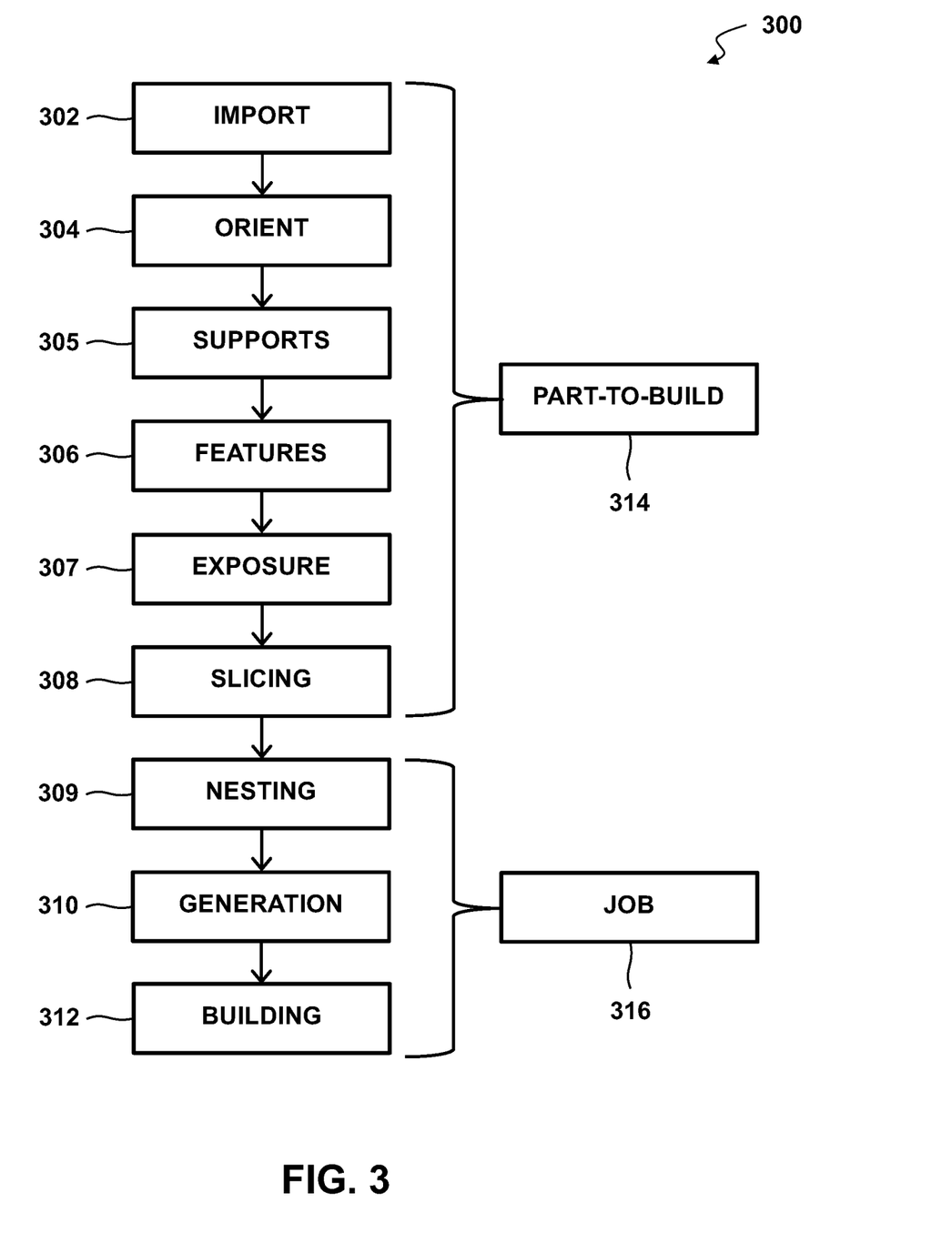
FIG. 3 is a flow chart of a top level functional process of a Part-to-Build embodiment.

FIG. 3 illustrates a flowchart of the Part-to-Build system workflow where a Part-to-Build file 314 includes an original 3D CAD file imported 302 from a 3D CAD Model. Once imported 302, the system 300 may orient 304 the part by placing the part in the proper orientation space and generating orientation data. Subsequent to orienting 304 the part, the system 300 may detect regions to support and create appropriate support 305 structure data to be added to the oriented part data. The system 300 may then automatically determine, via recognition of any features 306, i.e., volumes, what features are to be included in the generation of feature data. In certain embodiments, a toolpath determination step may then be performed where creation of exposure 307 strategy data 307 for the original part and its related support structure data is determined. In other embodiments, the Part-to-Build file 314 is generated without exposure strategy data 307. A slicing 308 step may then be performed to determine slicing data related to an internal slicing of the model, saving time for preparing any subsequent job files. At this point, the Part-to-Build steps have imported 302 a CAD file and prepared the CAD file for print production; and the Part-to-Build file 314 has been saved for future job file generation 310. Once a part-to-build file 314 has been created, a job 316 selection may be performed to setup the job 316 using Part-to-Build files 314 and to optimize the work envelope and the processing of parts. The job 316 may be performed by nesting 309 and automatically placing and orienting different parts within the job. A job file is created and/or generated 310 which may then be executed. Finally, the actual additive machining may be performed to build 312 the part based on the Part-to-Build file 314 previously generated.

By storing the manufacturing information needed to build the part in a Part-to-Build file 314, the file 314 may then be used in one or more job files without redefining the manufacturing information. This manufacturing information provides information on how the part is oriented in space for the build (i.e., rotation and translation) and is used for creation of a job file that itself may comprise one or more Part-to-Build files 314, nested and repeated as needed, and formatted into a machine-specific format.

Figure 4:
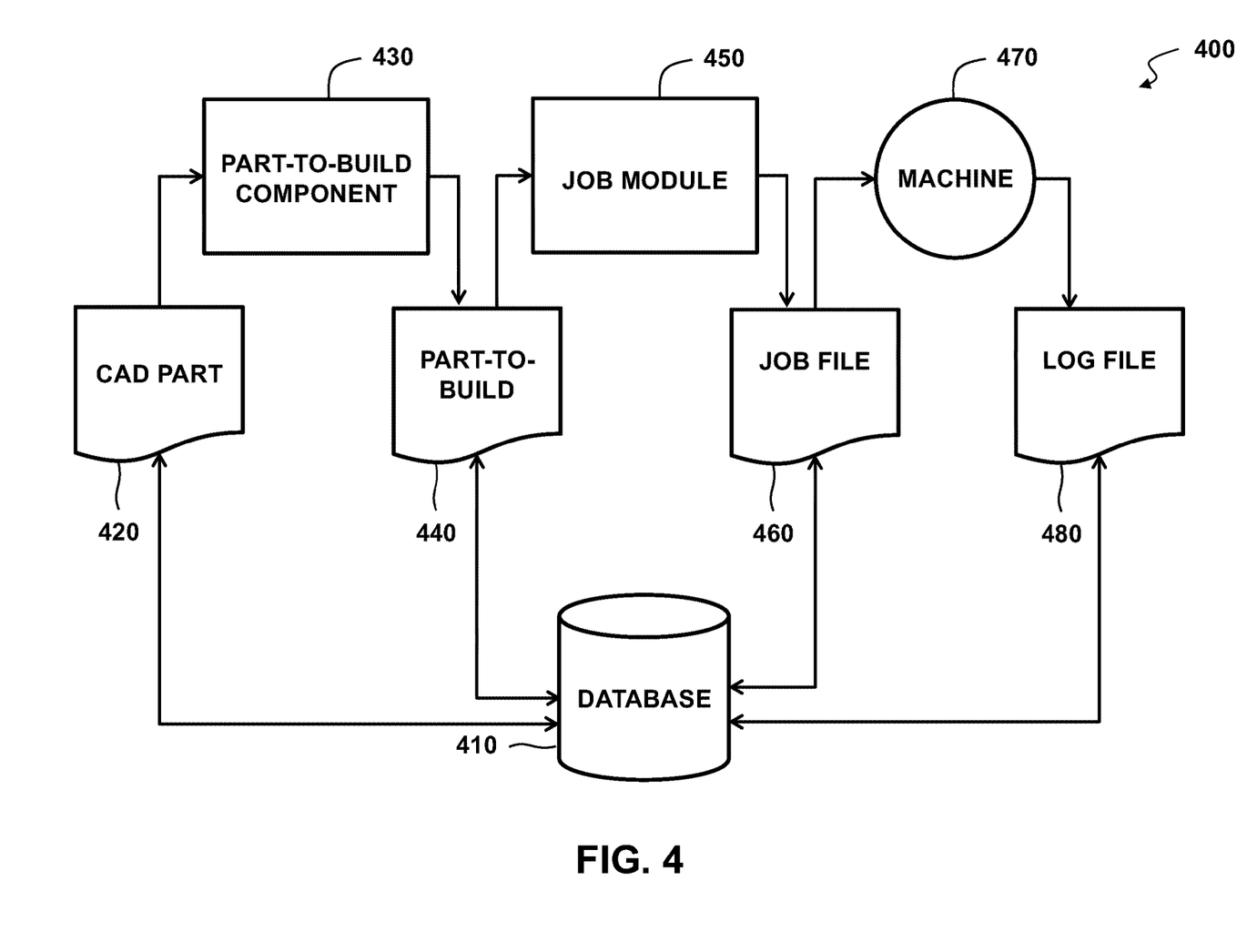
FIG. 4 is a flow chart of a top level functional process of 3D machining process embodiment using Part-to-Build.

FIG. 4 depicts a functional block diagram of the Part-to-Build system 400 where the system 400 may use a database 410 where all the intermediate objects: CAD part 420, Part-to-Build file 440, job file 460, log file 480, and all the links between these files may be stored in a central database 410. The database 410 may act as a central node that links the different objects. Accordingly, a CAD part 420 may be an input to a Part-to-Build component 430 where a Part-to-Build file is determined and stored in the database 410. Once the Part-to-Build file 440 is determined, it may then be used in a job module 450 to create a job file 460, where the job file 460 may also be stored in the database 410. The job file 460 is then used as input to the 3D printing machine 470 that may then create a log file 480, also stored in the database 410.

Figure 5:
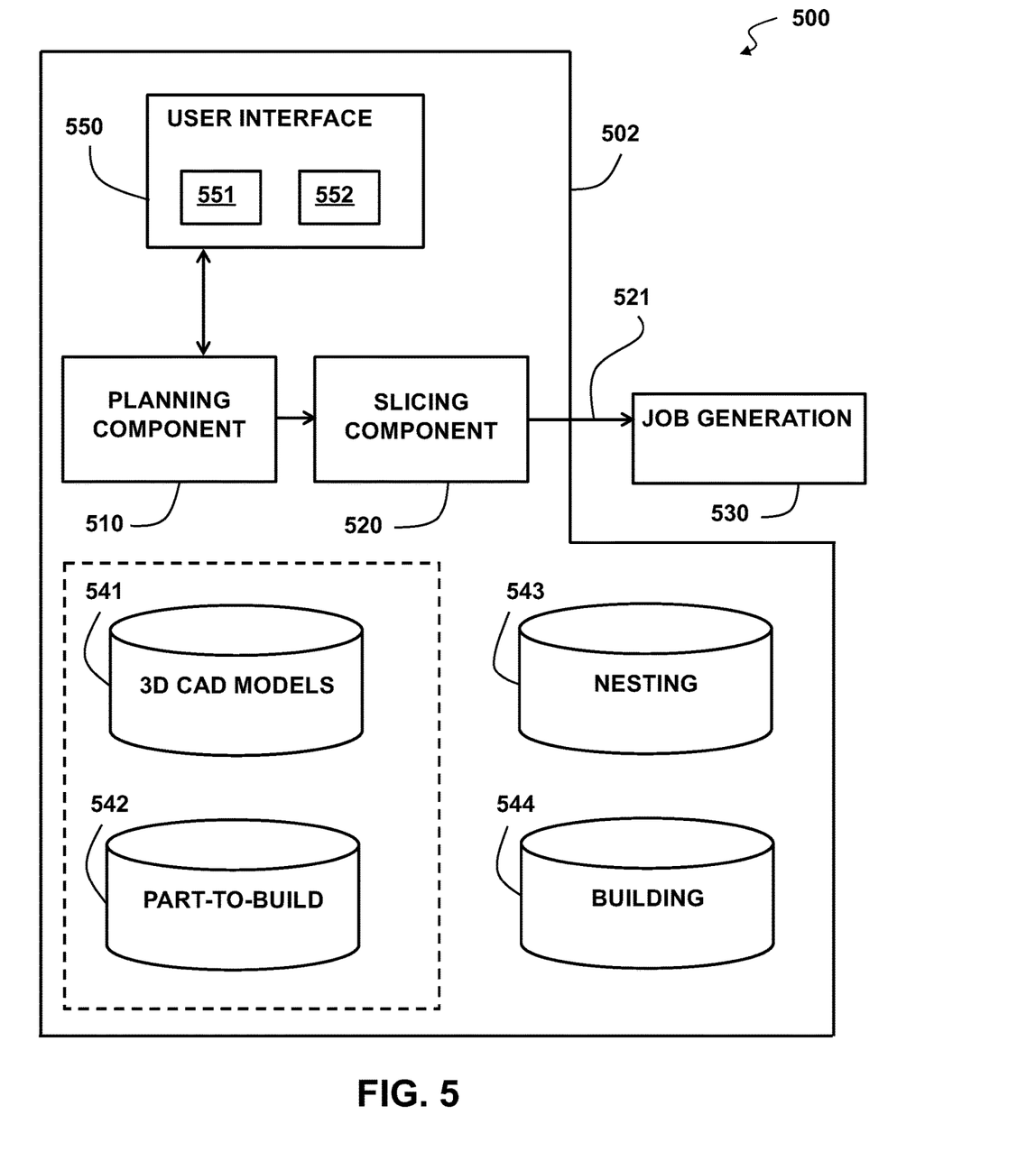
FIG. 5 is a functional block diagram of a Part-to-Build system according to various aspects of the present embodiments.

FIG. 5 depicts a functional block diagram of the Part-to-Build system 500, where the system 500 comprises a user interface 550 that allows for the inputting or importing of 3D CAD files 551, 552 from a 3D CAD models database 541. A planning component 510 may be executed by the system to generate manufacturing information and to orient the part, determine supports, recognize features, and (optionally) determine exposure strategies, i.e., toolpaths. The planning component 510 may then determine a Part-to-Build file and store the file in a Part-to-Build database 542. In certain embodiments, a slicing component 520 may read as input from the planning module 510 and use one or more of the Part-to-Build files stored in the Part-to-Build database 542, for slicing. In other embodiments, the slicing component 520 is utilized by the planning component 510 in the generation of manufacturing data and slices the 3D CAD files 551, 552 prior to the generation and storage of the Part-to-Build file. The slicing component 520 may divide the 3D model stored in the one or more Part-to-Build files or in the 3D CAD files 551, 552, into a number of horizontal layers for job preparation. In additional embodiments, a job generation component 530 may then receive from the slicing component 520 all the data 521 necessary for and associated with the part for job file creation. In further embodiments, the job generation component 530 may receive the data 521 necessary for job file creation from the planning component 510 or Part-to-Build device 502. The job generation component 530 may then, via an automatic placement and orientation of the different parts in the job, create a nesting 543 for setting up the job using the Part-to-Build files and process the parts for building 544.

In one embodiment of the Part-to-Build system 500, a re-usable intermediary file, the Part-to-Build file, may be determined thereby distributing the preparation of the job file to different components of the system. By apportioning the processing to different components and steps, e.g., two steps, the need for redefining any manufacturing information for each job may be eliminated. That is, the Computer-aided manufacturing (CAM) component may create a job file with all the parameters for all entities and the Computer numerical control (CNC) component of the additive machine may directly generate the trajectory from all the given parameters. In this scheme, all the given parameters may be grouped in a job file. Hence, in the powder bed after the slicing, a file is created with all the contours of each area to melt in each layer. Optionally, in an additive CAM component utilizing the Part-to-Build system 500, after slicing is performed, the contours are saved in a slice file. Then parts are nested in the job module. When the job is exported, the slice file is exported in a layer file (.sli or .clf) taking into consideration the position of the part in the job. Then, layer file and feature parameters are grouped in a job file. The job file may comprise all the information needed to create the trajectory but the trajectory is directly created by the CNC. Accordingly, the need for exporting of such contours in a layer file, for example, .sli or .cli or .clf, may be diminished since their parts are already nested.

Figure 6:
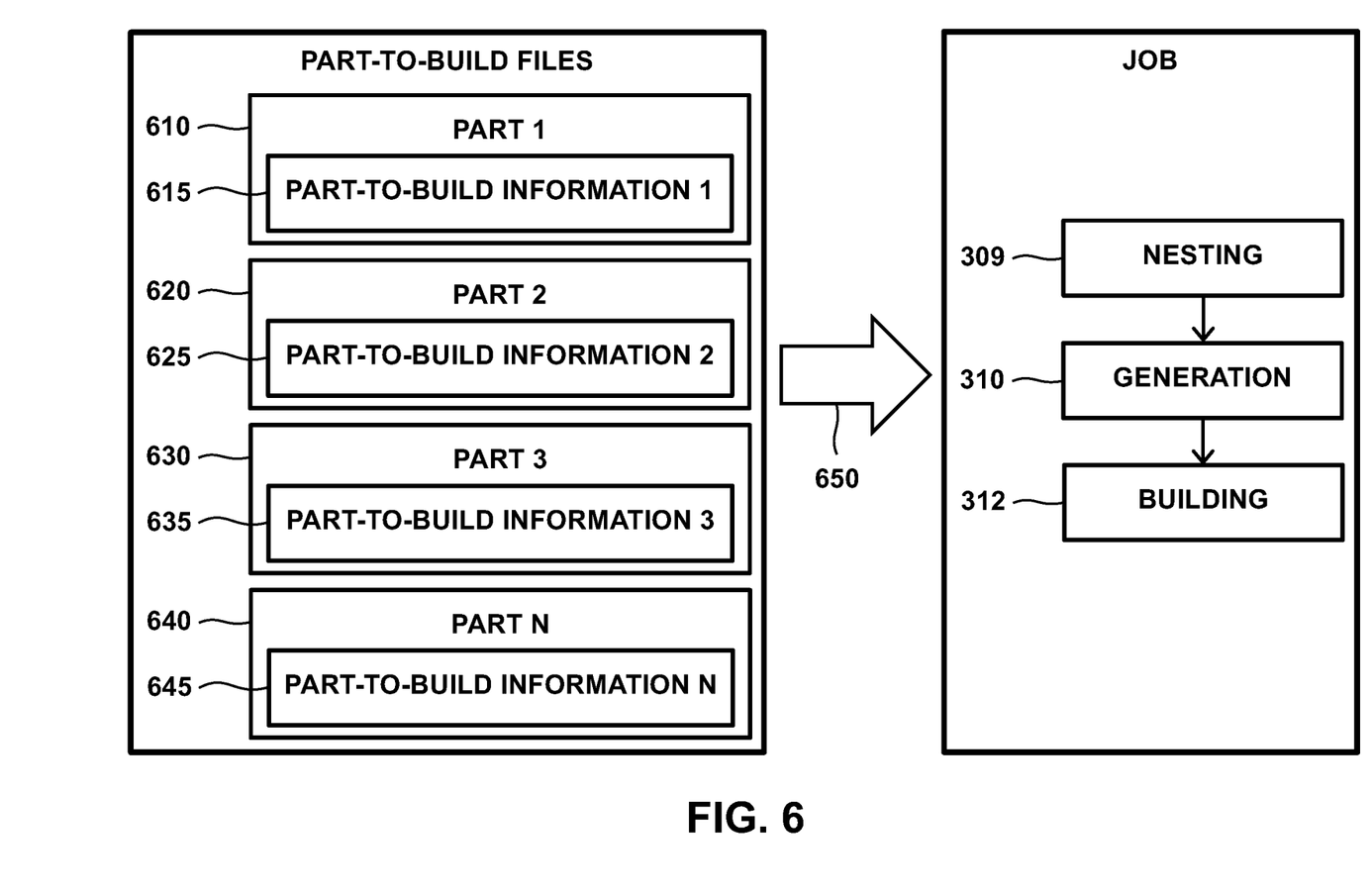
FIG. 6 depicts a flow chart of an optimized workflow in a Part-to-Build system according to various aspects of the present embodiments.

FIG. 6 depicts a flow chart of an optimized workflow in a Part-to-Build system. By determining a set of Part-to-Build files, where each part 610, 620, 630, 640 is saved with all the Part-to-Build information 615, 625, 635, 645 required to make that part, at any time, those different parts 610, 620, 630, 640 may be easily put into a job selection 650 and built 312. That is, the Part-to-Build file, whether stored in a database or in addressable memory for quicker access, may provide links to all the intermediate objects and allow the system to link all the files, for example, CAD parts, parts to be built, job files, log files, etc. As depicted, different job numbers may be used by the job selection component, where the system may perform a job selection 650 by bringing in numerous Part-to-Build files, nest 309 them in proper configurations, generate 310 a job file, and build 312 the parts via the machining step.

Figure 7:
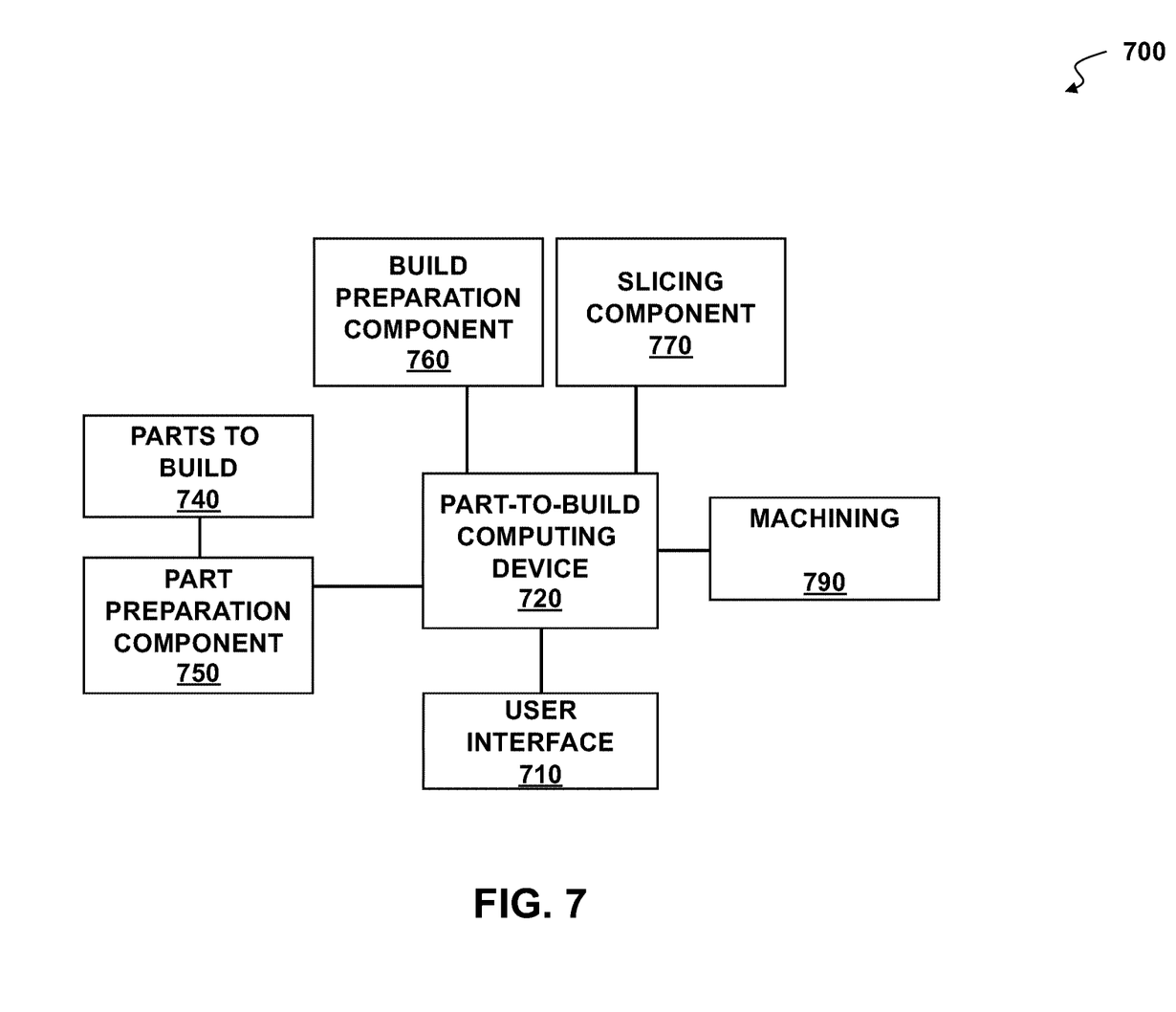
FIG. 7 depicts a functional block diagram of the Part-to-Build system according to various aspects of the present embodiments.

FIG. 7 depicts a functional block diagram of an embodiment of the Part-to-Build system 700. In this embodiment, a user interface 710 may be provided for accepting user input data. The Part-to-Build computing device 720, may comprise a processor and addressable memory, and synchronize the different components via a linking function. In one embodiment, a set of parts that are needed to be built, parts to build 740, may transmit all the parts that are needed to be built to a part preparation component 750 which may determine the different parts that are to be built, i.e., prepare the part(s), for example, in a list. A build preparation component 760 may then be executed to prepare a build, where the build preparation component 760 does not prepare all the parts received from the part preparation component 750 as they arrive, instead, each part is prepared once. Once each of the parts are prepared by the part preparation component 750, at the end of the build preparation 760, the slicing component 770 may then slice each prepared part. In one embodiment, each part may be placed in a build chamber during the build preparation. Subsequently, to export the build file, the sliced parts are repeated and transformed corresponding to the place of the part in the chamber. In some embodiments, the Part-to-Build computing device may output data for machining 790 by a 3D printing machine.

Figure 8:
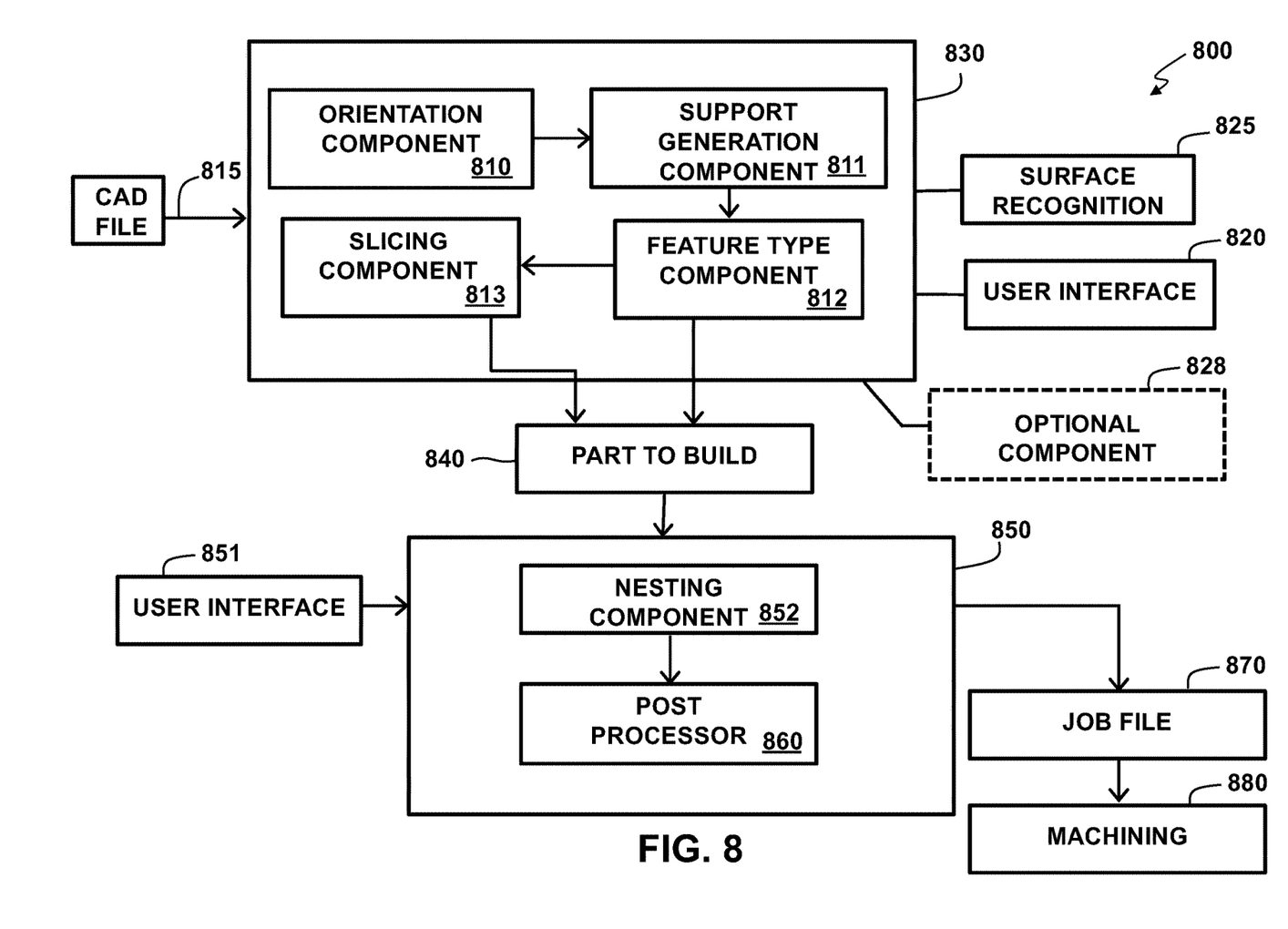
FIG. 8 depicts another functional block diagram of the Part-to-Build system according to various aspects of the present embodiments.

FIG. 8 depicts a functional block diagram of a Part-to-Build system 800. In this embodiment, a Part-to-Build component 830 takes in as input CAD data, for example, a 3D CAD file, and determines Part-to-Build data to output, for example, as a Part-to-Build file 840 where the Part-to-Build file 840 may be sent to a Job Processing Component 850—itself in communication with a user interface 851—and utilizing a nesting component 852 and a post processor component 860 may then generate and output a job file 870 based on the input. In one embodiment, the system may select part data 815 for a specific part intended for printing from a number of part data stored in the 3D CAD file. That is, a subset of one or more parts and associated part data out of a complete set of parts and parts data may be extracted from the CAD file for processing. The system 800 may use the generated job file 870 for machining 880 the desired build for one or more parts.

The Part-to-Build component 830 may be in communication with a User Interface 820, e.g., for accepting and/or outputting user data, and a surface recognition component 825. The Part-to-Build component 830 may comprise a feature type component 812, a support generation component 811, an orientation component 810, and a slicing component 813. In one aspect of the embodiments, the orientation component may generate orientation data based on the selected orientation of the input CAD file. In some embodiments, the user interface 820 may provide input from a user regarding which parts 815 from the 3D models contained in the 3D CAD file are to be selected and included in the build process. In some embodiments, the orientated parts selected from the 3D models within the 3D CAD file may be utilized as an input for the support generation component 811 to generate support data. In other embodiments, the generated supported and oriented parts from the 3D models may be utilized as an input for the feature type component 812 which may analyze the features of the oriented 3D model and associated supports. In one embodiment, a feature may be the model describing the part to print and may be divided into several features. Each feature, for example, a solid or a volume, may have a unique manufacturing strategy associated with it. Further, a feature type may be a generic feature characterization, for example, rough, thin wall, net, support, etc.

In some embodiments, the surface recognition component 825 may be utilized to provide additional data necessary to analyze and determine feature types. In one embodiment, the user interface 820 may provide feedback to the user regarding the determined features and allow for the input of selection and/or solution data that may be utilized by the Part-to-Build component 830 to modify and/or select the generated data. In some embodiments, the 3D model with associated orientation data, support data, and feature type data may be utilized as an input for a slicing component 813 which may generate slicing data for the Part-to-Build file 840. In an alternate embodiment, the analyzed feature data based on the oriented 3D model and associated support generated data may be used to determine the Part-to-Build file 840 and then transmitted to the Job Processing Component 850 as input data for processing. In certain embodiments, the Part-to-Build component 830 has an input for an optional component 828 that may allow for the inclusion in alternate data types in future Part-to-Build file 840 generation.

In some embodiments, the Part-to-Build system 800 may contain a job processing component 850 that may generate a job file 870 for use by a 3D printer in order to direct machining 880. In one embodiment, a user interface 851 may be in communication with the job processing component 850. In some embodiments, the user interface 851 may a user to input job file creation parameters based in part on the transmitted Part-to-Build file(s) 840. In one embodiment, the job processing component 850 comprises a nesting component 852 and post processor 860. In some embodiments, the nesting component 852 may utilize input from a user interface 851 to generate a nesting matrix that may allow for the nesting of various parts within the desired build. In one embodiment, the nesting matrix data is output to a post processor 860 that may utilize all available data to generate a job file 870 for use by a 3D printer. In some embodiments, the job file 870 may contain all of the necessary instruction to allow for the machining 880 of the desired build.

Figure 9:
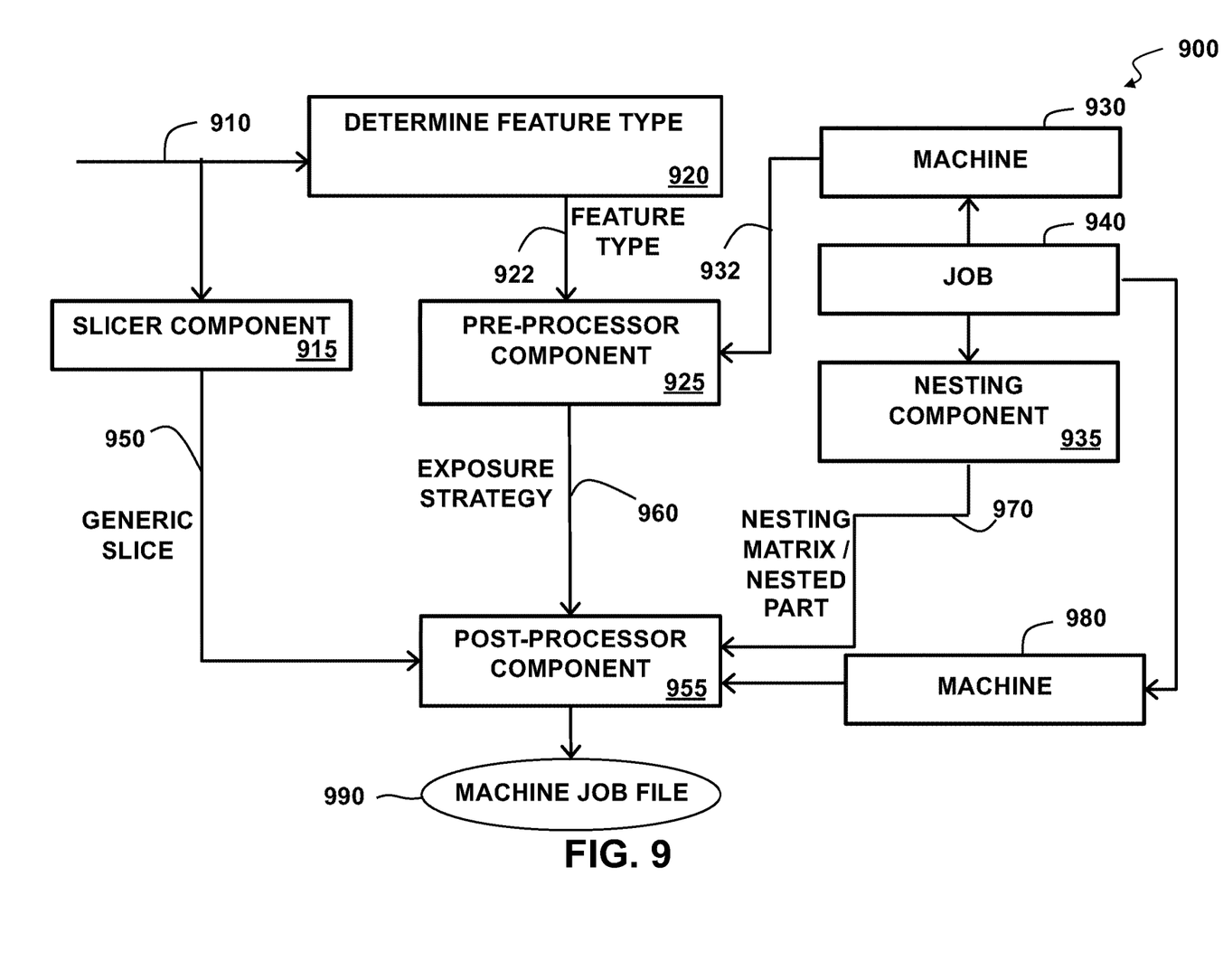
FIG. 9 depicts a data workflow of the generation of a machine job file utilizing Part-to-Build data according to various aspects of the present embodiments.

FIG. 9 depicts a data workflow 900 of the generation of a machine job file 990 utilizing Part-to-Build data 910 according to various aspects of the present embodiments. In a number of embodiments, the workflow 900 takes in Part-to-Build data 910, for example, a Part-to-Build file, from an external and/or internal source. In certain embodiments, the source may be from the 3D printer. In additional embodiments, the external source may be a remote user terminal that allows users to submit parts to be built at a third-party printing station. In some embodiments, the external source may be a computing device attached in some form (physical or wirelessly) to the machine job file generation component. In the embodiment of FIG. 9, a machine job file 990 may be determined based on the selected parts for inclusion in the machine job file 990 upon being selected by the user as a job 940. The job 940 may be sent to the machine 930 to determine machine-specific information data 932 including, but not limited to, machine brand, and build chamber dimensions. The machine-specific data 932 may then be sent to a pre-processor component 925. In some embodiments, data representing the feature types 922 may be determined based on the Part-to-Build data 910 at block 920. In some embodiments, the generated feature type data may be utilized as input data for the pre-processor component 925. In some embodiments, feature type data may represent a closed body or geometry of the Part-to-Build data 910 which may be divided into a plurality of features, each having a topological specificity that may require a specific manufacturing strategy. By way of example, and not limitation, a Part-to-Build file composed of a support, a massive region, and a mesh region may be divided into three different features since each feature (support, mass region, and mesh) may have a different associated manufacturing strategy. In still further embodiments, the pre-processor component 925 may, based on the feature type data 922 and the machine-specific data 932, generate an exposure strategy 960 which may be output as a set of data relating to each feature type for use in the post-processor component 955. In one embodiment, the exposure strategy 960 may be determined for the job based on associating an exposure strategy with the feature type data 922 and machine-specific data 932.

In one embodiment, the exposure strategy data 960 may, for example, be for the use and direction of ultraviolet light for curing and solidifying the pattern traced on the resin and joining to the printed layer below. In one embodiment, the Part-to-Build data may include geometric data extracted from the CAD file and/or all the data stored in the CAD file. In some embodiments, the Part-to-Build data 910 is fed into a slicer component 915 for slicing data determination. In certain embodiments, the Part-to-Build data 910 may already include slicing data based on previous slicing calculations done during the preparation of the Part-to-Build file (see FIG. 8, ref. no. 813). In these cases, the slicer component 915 may simply pass the slicing data along without the need for further slicing calculations. In other embodiments, when relevant slicing data is not present in the Part-to-Build data 910, the slicer component 915 may generate the slicing data necessary for passing to the post-processor component 955. That is, a check is performed by the slicer component to determine whether the Part-to-Build data 910 includes slicing data—which may be done via a flag—and if slicing data is already included, filter and pass that data to the post-processor component 955. If the slicing data is not previously determined and included in the Part-to-Build data 910, then the slicer component 915 may perform the slicing and determine generic slice data 950 to pass to the post-processor component 955. Accordingly, the slicer component 915 passes generic slice data 950 to the post-processor component 955.

The user-selected job 940 may require that parts be nested in order to increase build efficiency. In some embodiments, the job 940 may be passed to a nesting component 935 for determination of a nesting matrix 970 and/or nested part which may be fed into the post-processor component 955 for use. In additional embodiments, the post-processor component 955 may utilize the nesting matrix data 970 in order to translate the generic slice data 950 for use in a nested print job. In one embodiment, the job 940 may provide data to the 3D printing machine 980 where the machine 980 may determine and send data relating to machine-specific attributes to the post-processor component 955. In some embodiments, the machine-specific data may be utilized by the post-processor component 955 to better determine the data needed to be generated in the machine job file 990. In some embodiments, the post-processor component 955 utilizes all available input data including, but not limited to, generic slice data 950, exposure strategy data 960, nesting matrix and/or nested part data 970, and/or machine-specific data to generate a machine job file 990 that directs the 3D printer to build and print the user-selected job as desired.

Figure 10:
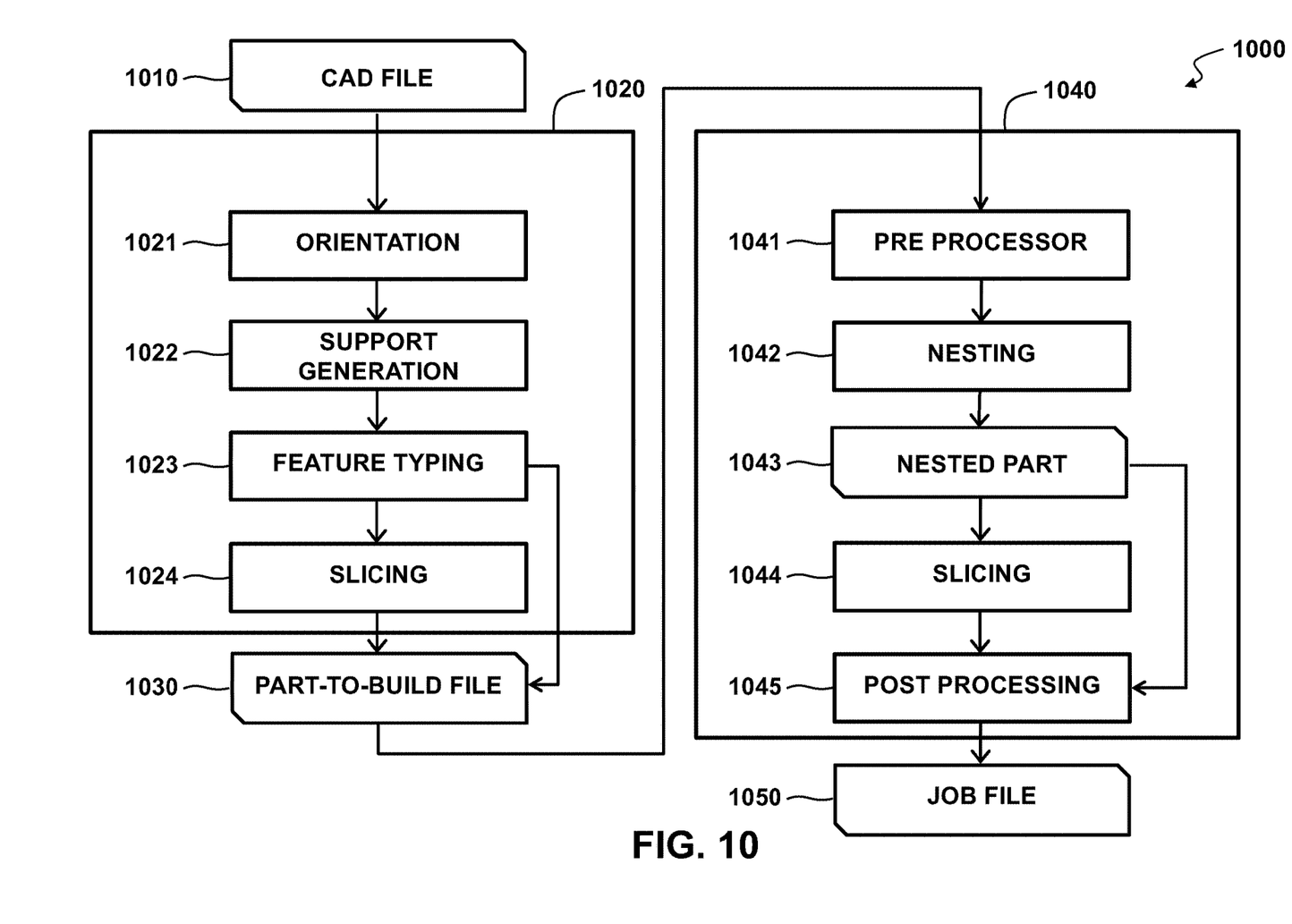
FIG. 10 depicts a workflow of a Part-to-Build system according to various aspects of the present embodiments.

FIG. 10 depicts a functionalities workflow of a Part-to-Build system 1000. In one embodiment, the workflow 1000 takes as an initial input a CAD file 1010 that is fed into a Part-to-Build block 1020. Within the Part-to-Build block 1020, the CAD File data may be passed through an orientation component 1021 to generate orientation data, and then a support generation component 1022 to generate support data. In some embodiments, the CAD file 1010, orientation data, and support data, may be utilized by the feature typing component 1023 to generate feature data. In certain embodiments, slicing is not done by the Part-to-Build block 1020 and the Part-to-Build file 1030—comprising Part-to-Build data—may be generated based on the 3D CAD file 1010, along with the manufacturing information comprising orientation data, support data, and feature data. In other embodiments, the Part-to-Build block 1020 generates slicing data via a slicing component 1024 and incorporates the slicing data as manufacturing data within the generated Part-to-Build file 1030. In one embodiment, the generated Part-to-Build file 1030 may not, or is not intended to be, modified once it is created. That is, the generated Part-to-Build file 1030 may be validated upon generation to decrease the likelihood of future changes and/or tampering of the file structure. In this way, the Part-to-Build file may be used for trackability. The validating of the Part-to-Build file may be via setting a flag that may indicate the state of the Part-to-Build data generated based on the CAD file. The flag may be used to prevent any modification and fix and/or save the data in the current state to ensure the trackability of the data through the job generation process and further, allow an association of the part with the Part-to-Build data file.

In further embodiments, the job generation block 1040 may take as input the Part-to-Build data file 1030 and proceeds to generate exposure strategy data in the pre-processor component 1041. In embodiments that have nested parts, a nesting process 1042 may generate nested part data 1043. In a variety of embodiments, the Part-to-Build data file 1030 may not have embedded slicing data for use by the job generation block 1040, which would require the job generation block 1040 to pass the nested part data 1043 to a slicing component 1044 for generation of slicing data. In a number of embodiments, a post processing component 1045 within the job generation block 1040 may take sliced data from either the slicing component 1044 or from pre-sliced nested part data 1043 and generate a finalized job data file 1050 for use by the 3D printer in order to facilitate the selected build. In some embodiments, the finalized job data file 1050 may comprise machine-specific position data and exposure strategies associated with each slice in the print job.

Embodiments have been described with reference to flowchart illustrations and/or block diagrams of methods, apparatus (systems) and computer program products according to embodiments. Each block of such illustrations, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

The visual displays in the figures are generated by modules in local or cloud based applications on computing devices and/or on the system/platform, and displayed on electronic displays of computing devices for user interaction and form graphical user interface for interaction with the system/platform disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:
1. A system comprising:
a part-to-build component, wherein the part-to-build component comprises a processor and an addressable memory, the processor configured to:
  determine part data from a received at least one computer-aided design (CAD) file;
  determine a part-to-build file based on: geometry data associated with the received at least one CAD file; and
a job generating component wherein the job generating component comprises a processor and an addressable memory, the processor configured to:

generate a nesting matrix associated with a received determined part-to-build file via a nesting component;

generate slicing data based on the generated nesting matrix associated with the received determined part-to-build file; and determine a job file based on the generated nesting matrix and the generated slicing data, wherein the job file comprises data for operating a three-dimensional printer.

2. The system of claim 1, wherein the part-to-build component processor is further configured to receive user input from a user interface.

3. The system of claim 1, wherein the part data comprises data relating to geometric information of at least one part stored in the received CAD file.

4. The system of claim 1, wherein the processor of the part-to-build component is further configured to:

generate orientation data associated with the determined part data via an orientation component;

generate support data associated with the determined part data via a support generation component; and generate feature data associated with the determined part data via a feature type component.

5. The system of claim 4, wherein the part-to-build file is determined further based on at least one of: the determined part data, the generated orientation data, the generated support data, and the generated feature data.

6. The system of claim 1, wherein the part-to-build component processor is further configured to receive surface recognition data related to the determined part data from an external surface recognition component.

7. The system of claim 1, wherein the job generating component processor is further configured to receive user input from a user interface.

8. The system of claim 7, wherein the generation of the nesting matrix is further based on the received user input.

9. A method comprising:

transmitting, by a computing device, a request to a three-dimensional (3D) printing machine for machine-specific data based on receiving job input data comprising data related to a desired build;

receiving, by the computing device, a part-to-build data, wherein the part-to-build data comprises: geometry data relating to at least one three-dimensional computer-aided design (CAD) file, and a set of manufacturing information data;

determining, by the computing device, nesting matrix data associated with the received part-to-build data; and determining, by the computing device, slicing data based on the determined nesting matrix data associated with the received part-to-build data; and determining, by the computing device, a machine job file based on determined nesting matrix data and determined slicing data.

10. The method of claim 9, wherein the determining of nesting matrix data is based on the received job input data.

11. The method of claim 9, further comprising:

determining, by the computing device, feature type data and exposure strategy data.

12. The method of claim 11, wherein determining the machine job file is further based on the determined feature type data and exposure strategy data.

13. A device for generating a job file, the device comprising:

a processor and addressable memory, the processor configured to:

receive at least one computer-aided design (CAD) file;

determine part data from the at least one CAD file;

generate a part-to-build file wherein the part-to-build file comprises:

geometry data related to at least one CAD file;

determine nesting matrix data associated with the generated part-to-build file;

determine slicing data based on the determined nesting matrix data associated with the generated part-to-build file; and generate a job file based on the determined nesting matrix data and determined slicing data.

14. The device of claim 13, wherein the part-to-build file further comprises: at least one of: the determined part data, orientation data, support data, and feature data.

15. The device of claim 13, wherein the generation of slicing data is based on data related to the determined part data, the data comprising at least one of: orientation data, support data, and feature data.

16. The device of claim 13, wherein the generation of the job file is related to the received data in the part-to-build file, exposure strategy data, and nested part data.

* * * * *